(12) United States Patent  (10) Patent No.: US 8,471,716 B2
Hansen  (45) Date of Patent: Jun. 25, 2013

(54) METHODS AND APPARATUSES FOR INDICATING THE LOCATION OF WATER FLOWING IN A FIELD

(76) Inventor: Michael Hansen, Atwater, CA (US)

( * ) Notice: Subject to any disclaimer, the term of this patent is extended or adjusted under 35 U.S.C. 154(b) by 399 days.

(21) Appl. No.: 12/950,119

(22) Filed: Nov. 19, 2010

(65) Prior Publication Data

US 2011/0121982 A1    May 26, 2011

Related U.S. Application Data

(60) Provisional application No. 61/264,552, filed on Nov. 25, 2009.

(51) Int. Cl.
*G08B 21/00* (2006.01)

(52) U.S. Cl.
USPC ........... 340/604; 340/437; 340/472; 340/624; 340/985; 116/202; 116/206; 116/209; 116/217; 116/220

(58) Field of Classification Search
USPC .......... 340/604, 437, 472, 624, 985; 116/202, 116/206, 209, 217, 220, 173
See application file for complete search history.

(56) References Cited

U.S. PATENT DOCUMENTS

| | | | | |
|---|---|---|---|---|
| 4,879,545 A | * | 11/1989 | Aguilar | 340/624 |
| 7,037,031 B2 | * | 5/2006 | Haynie | 404/6 |
| 2005/0252439 A1 | * | 11/2005 | Payson | 116/303 |

OTHER PUBLICATIONS

Field Water Alarm web pages (www.fieldwateralarm.com) and article dated Oct. 8, 2007.
Johnson, Bob: New Transmitter Tells Grower When to Shut Off Alfalfa Irrigation. AgAlert Weekly, Nov. 3, 2010.
U.S. Trademark Registration No. 3837101 dated Aug. 24, 2010.

\* cited by examiner

*Primary Examiner* — Tai T Nguyen
(74) *Attorney, Agent, or Firm* — Mark D. Miller; Marcus N. DiBuduo

(57) ABSTRACT

Signaling methods and apparatuses are described for preventing flood irrigation water from overflowing in a trench, field, or other area. Signaling devices may include indicators such as a reflector, a flag, a light, or a sound device provided on an end of an elongate member having its opposite end engaged with the ground. A stake is driven into the ground near the elongate member in the trench or other area where water will flow. A breakaway link such as a strip of paper is engaged to either the indicator or the elongate member and also to the stake, causing the elongate member to be bent downward, with the breakaway link located in the trench where water will flow. When exposed to the flow of water, the breakaway link weakens and eventually tears such that the elongate member springs upward carrying the indicator with it, signaling an operator that water has reached that location in the trench.

35 Claims, 10 Drawing Sheets

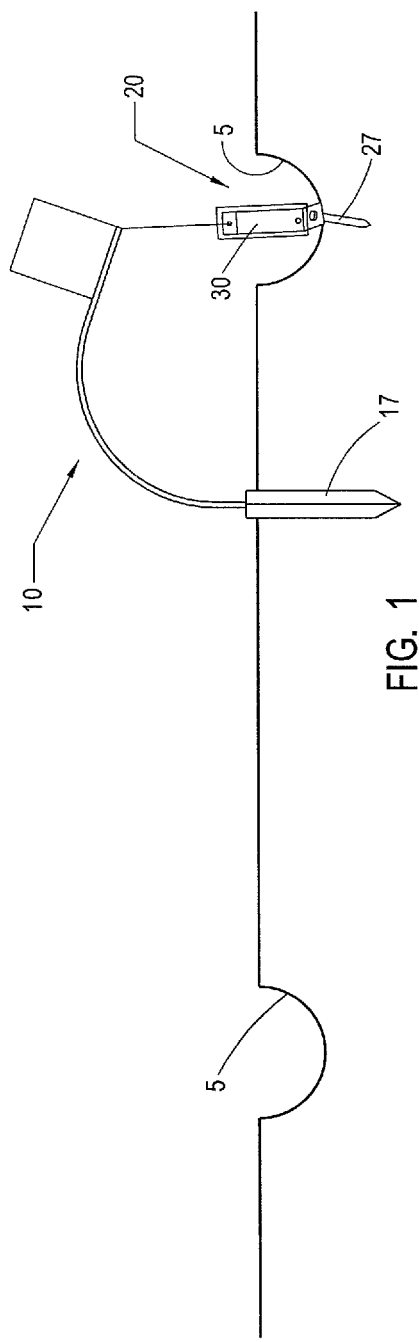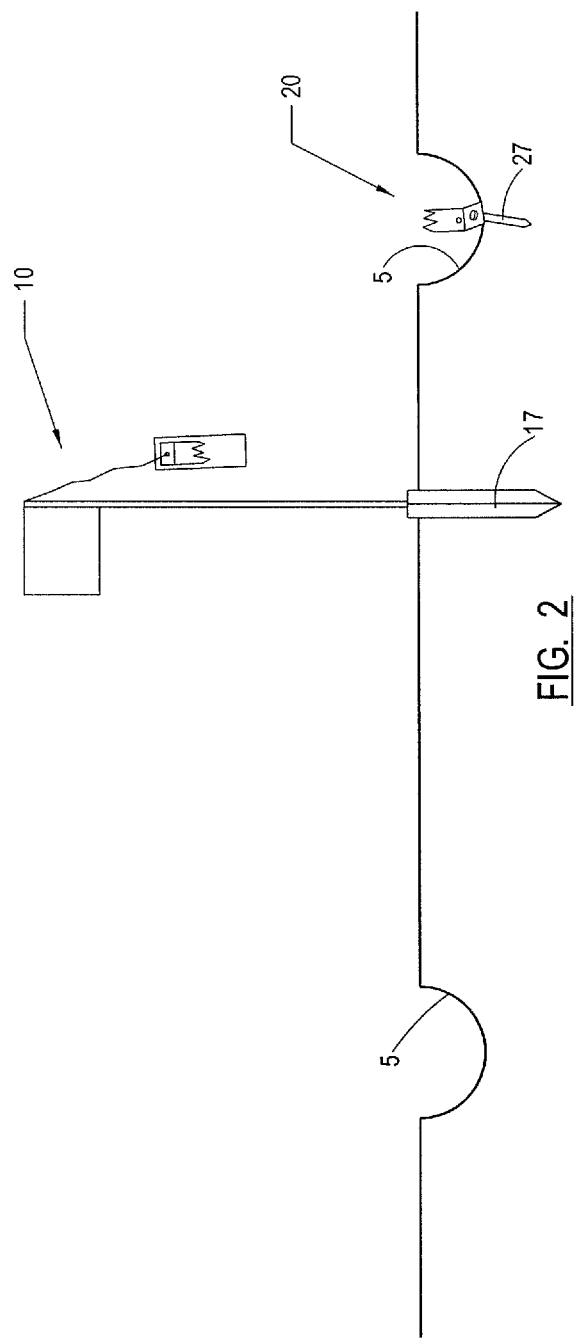

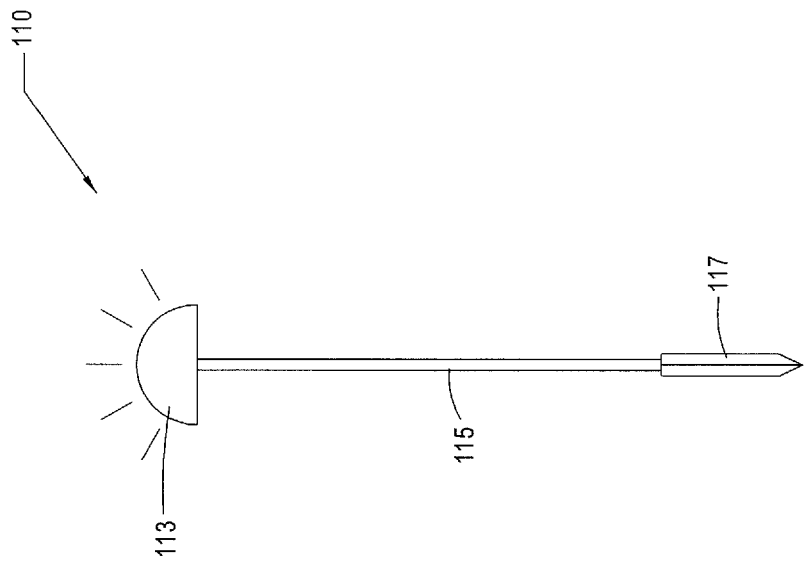
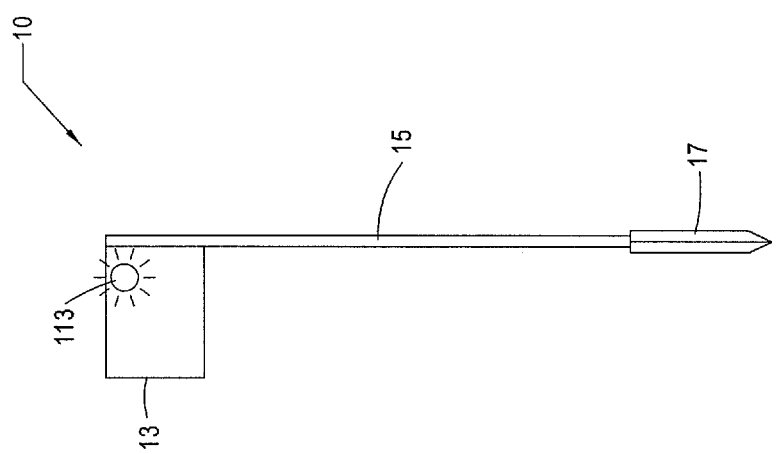

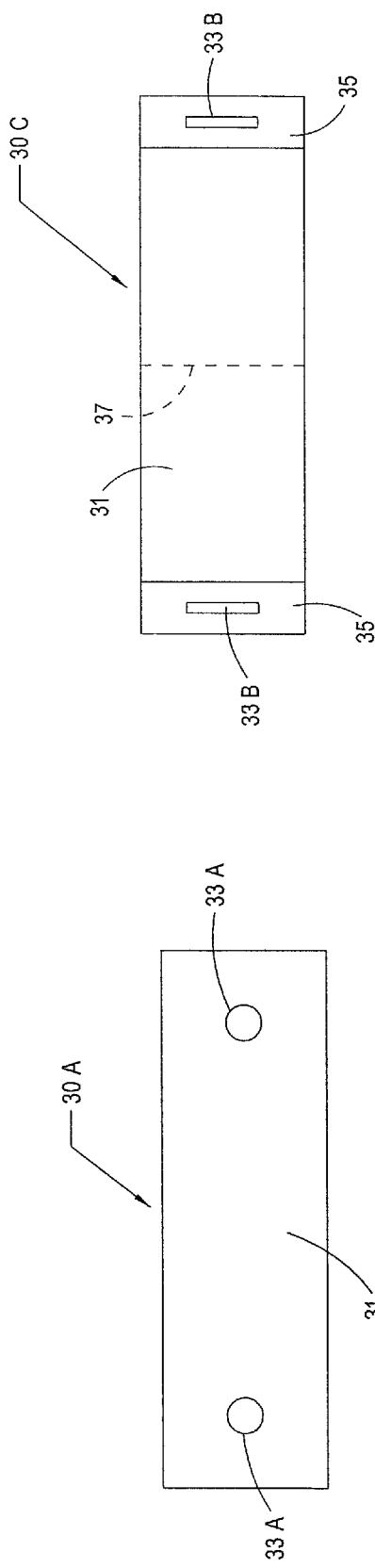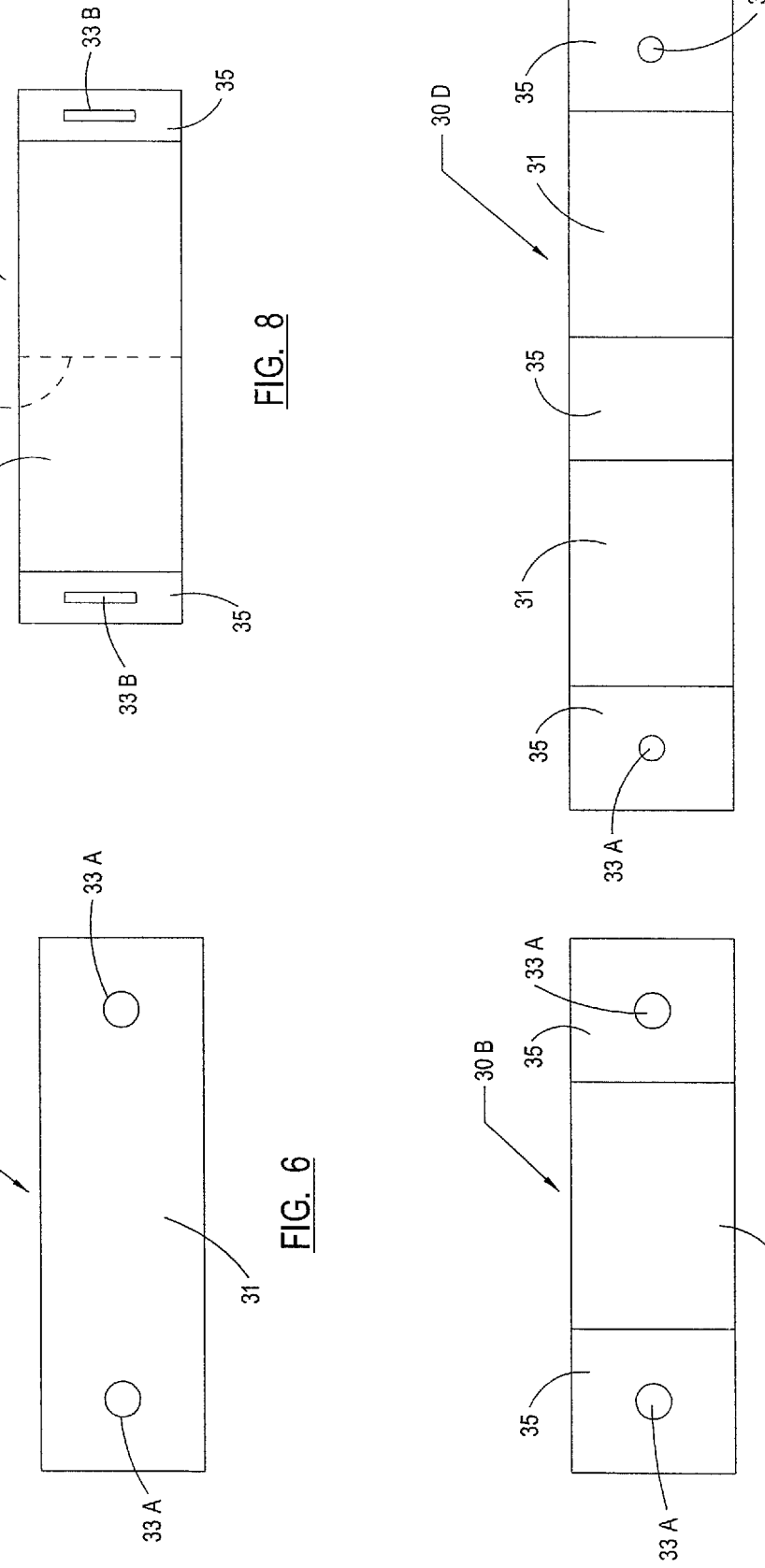

METHODS AND APPARATUSES FOR INDICATING THE LOCATION OF WATER FLOWING IN A FIELD

This application claims the benefit of U.S. Provisional Patent Application No. 61/264,552 filed on Nov. 25, 2009 which is incorporated herein by this reference.

BACKGROUND OF THE INVENTION

1. Field of the Invention

The present invention generally relates to agricultural irrigation. More specifically, embodiments of the present invention pertain to methods and apparatuses for indicating when irrigation water has flowed to a certain position.

2. Background and Description of Related Art

Flood irrigation of fields, and particularly fields of agricultural produce arranged in rows, typically is accomplished by a plurality of ditches or trenches. In some applications, such as in grape vineyards, narrow trenches extend alongside, and parallel with, one or both sides of a row of plants. In some other applications, such as in almond orchards, a ditch may comprise the entire area between adjacent rows of plants. Other examples of fields where trenches or ditches are used include, without limitation, fields where corn, cotton, melons, tomatoes and other plants are grown. Flood irrigation is also used in open fields such as those used for growing grain or alfalfa. These fields are ordinarily divided by small berms that run the length of the field. These berms form areas known commonly referred to as a "check". These "checks" may be sixty feet (60') wide, or wider in some cases, and may be as long as one quarter (¼) mile.

In some situations, a water inlet valve may be provided on at least one end of a ditch, trench or check. In other situations, an irrigation ditch or canal may be adjacent to the field, and siphon pipes are used to draw water out of the irrigation canal and into the trenches, ditches or checks of the field. In some situations, the ditch or trench may have a "U" shaped path such that it wraps around the end of the row opposite to the water inlet location.

When it is desired to irrigate a field, an irrigator can open a water inlet valve, or initiate a siphon using tubes, thereby discharging water into one end of the ditch, trench or check. Water in the ditch, trench or check advances through gravitational forces. Once the water reaches the end of the ditch, trench or check, if it has not been shut off, it may wrap around the row (for wrap-around designs), overflows onto the adjacent land, or result in ponding.

Rows of agricultural plants can span a significant length, perhaps 500 meters. Thus it is to be appreciated that, depending on the width of the trench or check, and the volumetric flow rate of the water inlet, it may take a significant amount of time for the irrigation water to completely fill the trench or check by traversing from one end to the other. Moreover, it is to be appreciated that because the water flows from one end of the trench of check to the other by gravity (i.e., the water will continue to flow until it has equalized in the trench or check), the flow of water may not instantaneously stop. This flow is sometimes referred to as a "head." For these reasons, it is necessary for an irrigator to close the water inlet valve before the water reaches the end of the trench or check.

After the valve is closed, water will continue to flow through the trench, ditch or check until equalized. It is preferable that this flow stop at the end without overflow. Conventionally, to prevent overflow (and thus prevent waste) of the irrigation water, the irrigator has another person stand a distance down the row and monitor the flow of water. When the flow of water reaches a determined point, the monitor can signal to the irrigator (for example, by a visual signal such as raising their hand or by an audio signal such as shouting) to shut off the water. For example, the pre-determined position may be about ¾ of the way down the row of a trench. The signaling person watches that position, and indicates when the flow of water in the trench has reached that position. In response to the signal, the irrigator shuts off the flow of water which then equalizes, with the head flowing to the end of the trench.

In many areas where water resources are scarce, overflow of water has caused flood irrigation to come under increased scrutiny. Pumping unnecessary water is expensive and wasteful. In addition, the labor cost of having a worker monitor the flow of water can be cost prohibitive.

It is therefore desirable to conserve water by providing apparatuses and methods for indicating when water flow in an irrigation check, trench or ditch has reached a predetermined position without the need for additional monitoring personnel.

SUMMARY OF THE INVENTION

Embodiments of the present invention relate to apparatuses and methods for indicating when water flow in an irrigation check, trench or ditch has reached a predetermined position without the need for additional monitoring personnel. More specifically, an indicating device can be tethered to a breakaway link disposed at a predetermined position in the field such that the indicating device is activated when the breakaway link detects that the flow of water has reached that position.

In some aspects, the invention concerns an apparatus that includes an indicator, an elongate member that may be attached to a first stake, a lower (second) stake, and a breakaway link. The indicator can be disposed on one end of the elongate member, the opposite end of which may be adapted to be engaged with the ground or with a first stake. The breakaway link can be operatively connected between either the indicator or the elongate member and the lower stake, and adapted to separate when exposed to water.

In some embodiments, the breakaway link can include a strip of paper. In some embodiments, each end of the breakaway link can have perforations through which it can be engaged to the indicator, the elongate member, and/or the lower stake directly or indirectly such as with a line, wire or rope. In some embodiments, the ends and/or center of the breakaway link can be reinforced for example, by a plasticized tape or a laminate. In some embodiments, the strip of paper can include a perforated, pre-scored or weakened line or area between the first and second ends which facilitates the breaking or tearing process.

In some embodiments, the indicator can include a flag, such as a brightly colored nylon flag. In some embodiments, the indicator (flag) and/or the elongate member may include reflective surfaces that may be easily observed from a distance using a flashlight or automobile headlights. In some embodiments, the indicator may be a reflective member or reflective surface provided at one end of the elongate member without any flag. In some embodiments, the indicator and/or elongate member can include a light source such as an LED, or an audio generator such as a buzzer. The light source is preferably not visible while the indicator and elongate member are bent down, but becomes visible when the paper strip fails allowing the indicator and elongate member to pop up into view. In some of these embodiments, circuitry can be provided to activate the light or audio generator when it is detected that the breakaway link has broken. For example, the circuitry can include a motion sensor or a switch coupled to the wire or rope.

In some embodiments, the elongate member can include a flexible rod or pole. In other embodiments, the elongate member can include at least two rigid members engaged through a hinge and spring. In yet other embodiments, the elongate member can be a telescopic rod capable of extending via a latch and spring system.

In some embodiments, either the elongate member or the indicator can be directly attached to a first end of the breakaway link, or indirectly attached such as through a first line, wire or rope, for example a nylon line. The other end of the breakaway link can be attached to the lower (second) stake either directly, or indirectly such as through a second line, wire or rope. In preferred embodiments, the second end of the breakaway link includes a round perforation for directly receiving the lower stake. A round perforation is preferred to prevent tearing of the link. In other embodiments, the breakaway link may be inserted through an opening in the indicator or elongate member, such that both ends of the link are engaged with the lower stake. In some of these embodiments, portions of the ends and/or the center section of the link may be reinforced with tape or laminate to prevent tearing, while leaving the remainder of the link un-reinforced.

In some embodiments, a first stake is provided for engagement with the ground and with one end of the elongate member. In some embodiments, the first and second stakes can be tethered to facilitate retrieval of both stakes. In some embodiments, a first line, wire or rope can have a first end attached to the elongate member, be intermediately engaged with the first end of the breakaway link, and have a second end that is attached to the lower stake. However, in preferred embodiments, a third line, wire or rope can directly couple the first and second stakes.

In other aspects, the invention concerns a method for determining when water has reached a position in a trench, that can include the steps of: (i) engaging one end of an elongate member having an indicator at its opposite end with the ground or with a first stake that has been driven into the ground; (ii) engaging a breakaway link with a portion of either the elongate member or the indicator; (iii) also engaging the breakaway link with a lower (second) stake; and (iv) placing the lower stake in the ground at a location proximal to the elongate member such that the lower stake and breakaway link will encounter water flowing through the field. The location where the lower stake and breakaway link are placed should be at or near the same location that would be monitored some other way by the user of the field during flooding. This location may be modified (e.g. to be closer to the water source) to compensate for the time interval (tear time) between the time when water touches the link and the actual failure of the link which results in the indicator signal.

In some embodiments, the lower stake can be positioned in the field such that the breakaway link is below a water line of the field. In some embodiments, the method can further include the steps of initiating a flow of water to flood the field, and upon receiving an indication that the breakaway link has broken, shutting off the flow of water.

In a typical scenario, an operator may place an apparatus of the present invention at a desired location in a field where it is known that the water should be turned off when it reaches that location, in order to flood the remainder of the field (or trench or ditch or check) without overflow. The operator then activates a water inlet to allow water to enter the field. The operator may then remain at the water inlet while watching for the indicator to be activated as a result of the flowing water weakening the breakaway link, or the operator may check back periodically to see if the indicator has been activated. Once the indicator is activated, the operator may then shut off the flow of water which, with appropriate timing, should equalize to the end of the field. The operator may then retrieve the indicator, elongate member, and stake(s) using a tether to locate the lower stake (which may now be under water). This procedure may be followed at night (since water may sometimes only be available at night) using a reflective or lighted indicator or elongate member.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a diagram showing use of an apparatus in accordance with some embodiments of the invention, where the breakaway link has not detected water in the trench.

FIG. 2 is a diagram corresponding to that of FIG. 1, where the breakaway link has detected water in the trench.

FIG. 4 is a side view of an exemplary flag indicator in accordance with some embodiments of the present invention.

FIG. 5 is a side view of an exemplary light indicator in accordance with some embodiments of the present invention.

FIG. 6 is a top view of an exemplary breakaway link having ends with round perforations in accordance with some embodiments of the present invention.

FIG. 7 is a top view of an exemplary breakaway link having reinforced ends with round perforations in accordance with some embodiments of the present invention.

FIG. 8 is a top view of an exemplary breakaway link having reinforced ends with rectangular perforations and a perforated breakpoint in accordance with some embodiments of the present invention.

FIG. 8A is a top view of an exemplary breakaway link having reinforced ends and a reinforced center with circular perforations in accordance with some embodiments of the present invention.

FIG. 13A is a side view showing an exemplary apparatus using a folded link of the embodiment of FIG. 8A.

DETAILED DESCRIPTION

The invention, in its various aspects, will be explained in greater detail below. While the invention will be described in conjunction with several exemplary embodiments, the exemplary embodiments themselves do not limit the scope of the invention. Similarly, the exemplary embodiments as illustrated in the accompanying drawings do not limit the scope of the exemplary embodiments and/or invention. Rather the invention, as defined by the claims, includes alternatives, modifications, equivalents and/or combinations of the various features described and illustrated herein.

It is to be appreciated that although the invention is described in conjunction with reference to facilitating flood irrigation of agricultural fields, apparatuses and methods in accordance with some embodiments of the present invention may be practiced with reference to other water detecting applications. For example, and without limitation, apparatuses in accordance with some embodiments of the present invention can be used to detect when water flowing in a ditch, trench, lake or stream has reached or exceeded a certain level.

Figure 3:
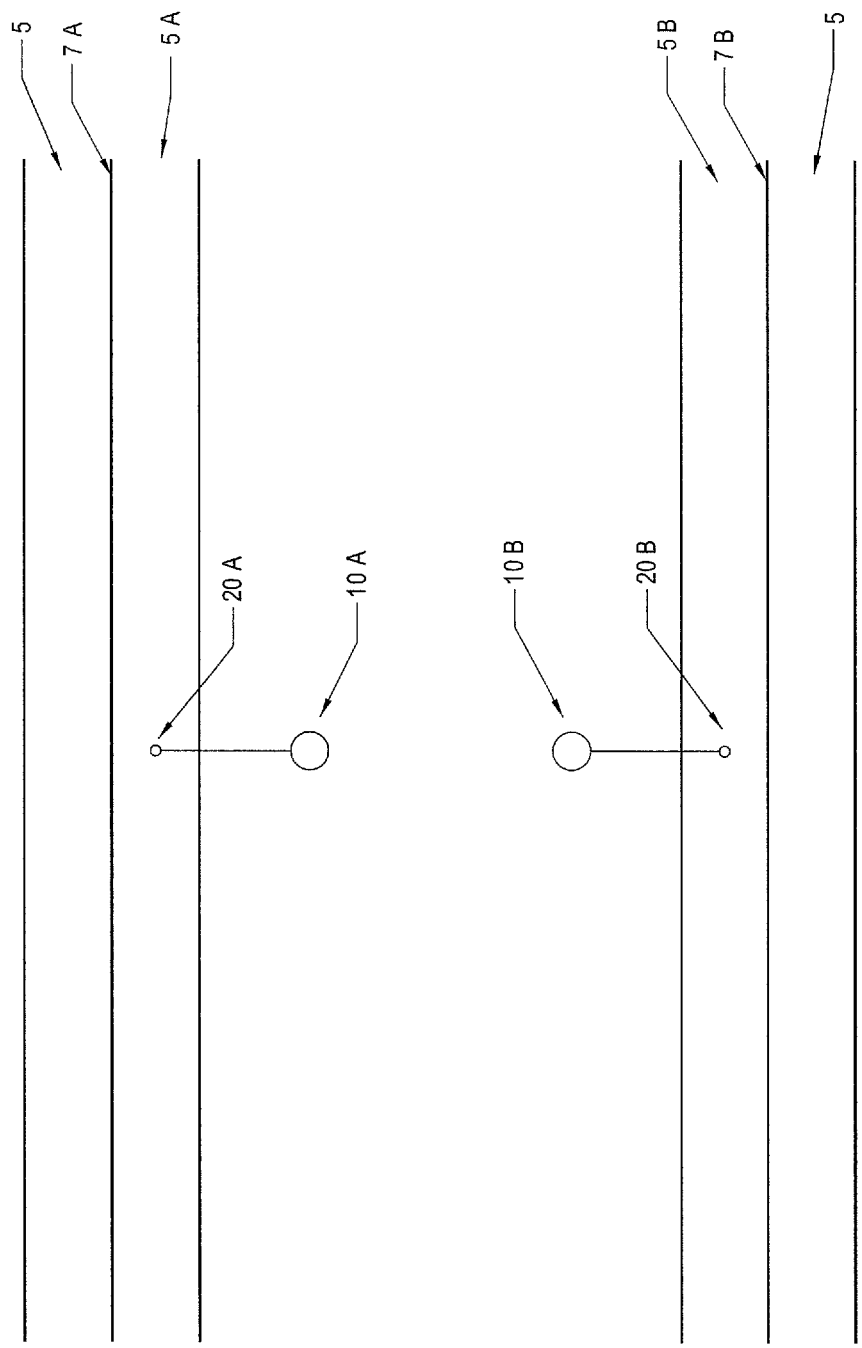
FIG. 3 is a diagram showing exemplary placement of apparatuses in accordance with some embodiments of the invention in a field.

Referring now to the exemplary illustration of FIGS. 1 and 2, an apparatus can have a first portion 10 generally comprising an indicator 13, and an elongate member 15, which may optionally be attached to a first stake 17 for signaling to a user when water has flowed to a first position in a trench 5. The apparatus can also include a second portion 20, including a lower (second) stake 27, and a breakaway link 30. In the exemplary embodiment of FIG. 3, a first portion 10A can be placed central to a row of agricultural plants (bounded by agricultural crop lines 7A and 7B) extending the length of the field. A second portion 20A of the apparatus can be placed in a trench 5A. In some embodiments, multiple apparatuses can be used, each to identify when water in the trenches reaches different predetermined locations. For example, and without limitation, a second apparatus including a first portion 10B and second portion 20B can be included in the same row of agricultural crop for identifying when water in second trench 5B reaches a second predetermined location (farther down the trench). It is to be appreciated that some embodiments of the present invention contemplate staggering the apparatuses. The best location for placement of an apparatus of the present invention should be known to the field owner because it will be the approximately the same location that the field owner would otherwise monitor using a spotting person. The field owner or grower will have learned this location from previous field flooding experiences. This position may be adjusted to compensate for the "tear" time between the first contact of water with the link and the actual failure of the link.

It is to be appreciated that in other applications, one or more apparatus 10 of the present invention may be placed at any pre-determined location(s) in a field to be flooded, in order to signal to a user that flood waters have reached such location(s). For example, and without limitation, one or more apparatus of the present invention may be placed at specified locations in an alfalfa check. The operator then introduces flood water into the check, and watches for the indicator(s) to be triggered. The operator may then reduce or shut off the flow of water, depending on the signals received from the apparatuses, using the operator's prior knowledge of how the field ordinarily floods.

As illustrated in FIGS. 1 and 2, the apparatus can include a first state (see, e.g., FIG. 1) and a second state (see, e.g., FIG. 2). In the first state, the first portion 10 (including the indicating flag) can be bent over thus signaling to the irrigator that water has not yet reached the predetermined position in the trench 5. As more fully discussed below, when the water in the trench 5 reaches the predetermined position, the breakaway link 30 causes the first portion 10 to indicate to the irrigator that water has reached the appropriate position. In some examples, and without limitation, the breakaway link 30 may give way (for example, and without limitation, by tearing), allowing the first portion 10 of the apparatus to spring or bend into an upright position. Once the irrigator identifies that the apparatus has transitioned from the first to the second state, he may then reduce or shut off the flow of water. It is further to be appreciated that the position of the breakaway link 30 should be such that it is exposed to water flowing in the trench or field. Thus, in preferred embodiments, the breakaway link 30 is located adjacent to the ground where the lower (second) stake has been inserted.

Referring now FIGS. 4 and 5, it can be seen that the first portion 10 of the apparatus can include a flag indicator 13 positioned at a top portion of an elongate member 15. In some embodiments, the elongate member 15 can include a first stake 17 integrally formed on an end thereof. However in other embodiments, the elongate member 15 can be attached to or otherwise engaged with the first stake 17. It is to be appreciated that the stake 17 can be driven into the ground with sufficient force to firmly secure the elongate member 15 therein. In some examples, the first stake 17 can first be driven into the ground and then the elongate member attached thereto by a screw, snap-lock, or pin and bolt connection. However, other means of engaging the elongate rod 15 with the ground or with first stake 17 are contemplated in accordance with some embodiments of the present invention. It is to be appreciated that in other embodiments, elongate member 15 may be simply driven directly into the ground without any stake.

In some embodiments, and with reference to the illustrations of FIGS. 1 and 2, the elongate member 15 can be flexible. In preferred embodiments, the elongate member is 3/16" in diameter and 5' long. In other embodiments, the elongate member can be rigid or telescopic. In some embodiments such as that illustrated in exemplary FIG. 5, the first portion 110 of the apparatus can include a light indicator 113 positioned at a top portion of a rigid elongate member 115. It is to be appreciated, however, that other types of elongate members are contemplated in accordance with some embodiments of the present invention. For example, without limitation, and as illustrated more fully below, the elongate member can include two rigid members connected together by a hinge and spring system. In other examples, the elongate member can include a telescoping rod that can be extended via a spring and latch system.

It is also to be appreciated that, in addition to a flag indicator and/or light indicator, other types of indicators are contemplated in accordance with some embodiments of the present invention. For example, and without limitation, the indicator and/or elongate member can include brightly colored devices (such as bright orange nylon flags), one or more reflective surfaces, one or more lights or light emitting diodes, a sound generating device (such as a buzzer, siren, or speaker), and/or a radio for generating an electrical signal that can be received by the irrigator through an appropriately configured receiver. Because irrigation of agricultural crops frequently occurs during the nighttime, in preferred embodiments, the indicator and/or elongate member can be a lighted or include reflective surfaces that may be easily detected using a flashlight or vehicle headlights.

Referring now to FIGS. 6-8A, the breakaway link 30 can include a strip of material having a first and a second end. In preferred embodiments, the material has a portion 31 which is formed of paper. It is to be appreciated that when the paper is exposed to water, it's tensile strength is reduced thus allowing for it to be torn into two portions by the restraining force of the first portion (for example, and without limitation, by the bent elongate rod). However, other materials are contemplated in accordance with some embodiments of the present invention. For example, the material may comprise a gelatin strip that is dissolvable in water. As illustrated more fully below, in some embodiments, one of the ends of the breakaway link can be connected to the elongate rod and the other can be connected to a stake driven into the ground. Upon the tearing of the paper, the two ends separate thus activating the indicator (for example, and without limitation, by allowing the flag indicator to move to an upright position, by revealing or illuminating the LED indicator, by sounding an audio alarm indicator), etc. In some embodiments, each end of the breakaway link can include perforations for facilitating attachment to the first and second portions of the apparatus, or to a stake. For example, and without limitation, breakaway link 30A can include perforations 33A for receiving a rope or wire therein.

In preferred embodiments, the perforations 33A are circular. However, in other embodiments, perforations 33B can be rectangular. For example, if a rope or wire is used to connect the breakaway link to either the first or second portion of the apparatus, a circular perforation can be used. In other examples, if a strap is used to connect the breakaway link to either the first or second portion of the apparatus, a rectangular perforation can be used. It is to be appreciated that the shape of the connecting perforations can be determined with reference to the means used to attach the breakaway device, so as to prevent premature tearing of the breakaway link at the perforation sites. Premature tearing of the breakaway link may further be prevented by reinforcement. In some embodiments, reinforcement 35 can be applied to portions of the breakaway link. In some examples, and without limitation, reinforcement 35 can include a plasticized tape or laminate, and may be provided around or near the perforations 33. In other examples, the ends of the breakaway link can be treated with a hardening compound such as glue.

Figure 8C:
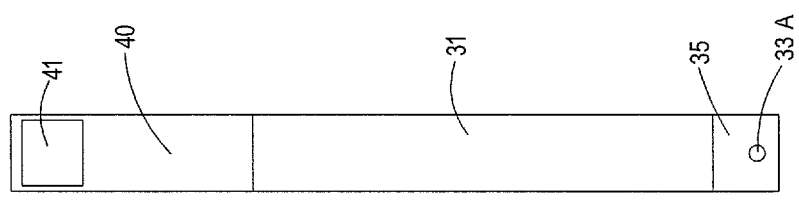
FIG. 8C is a top view of the exemplary breakaway link of FIG. 8B, uninstalled.

In some embodiments, the breakaway link 30C can include perforations 37 extending between the first and second ends for facilitating tearing, an example of which is shown in FIG. 8. For example, and without limitation, one or more pre-scored or perforation lines can be provided. It is to be appreciated that the number and size of perforations in perforation line 37 may be a factor in the time that it takes for the breakaway link 30 to tear after exposure to water (the "tear time"). For example, perforation line 37 having larger and more numerous perforations may tear sooner than a perforation line having narrower and less numerous perforations. In some embodiments, the irrigator can customize a breakaway link 30 to have a certain tear time by adding perforations. For example, and without limitation, an irrigator can use a hole punch to create one or more perforations to make the breakaway link tear quicker.

In addition, it is to be appreciated that the thickness and width of the strip 31 is a factor in the time that it takes for the breakaway link 30 to tear after exposure to water. Some additional factors include the tension applied on the breakaway link 30 by the first portion of the apparatus (for example, and without limitation, the diameter, strength, and length of the elongate device and/or of a spring associated with the first portion of the apparatus). In some embodiments, the irrigator can select from a number of different breakaway links by their rated time-to-fail. In some embodiments, multiple breakaway links can be used in parallel. For example, and without limitation, two or three breakaway links can be used to extend the tear time.

Figure 7B:
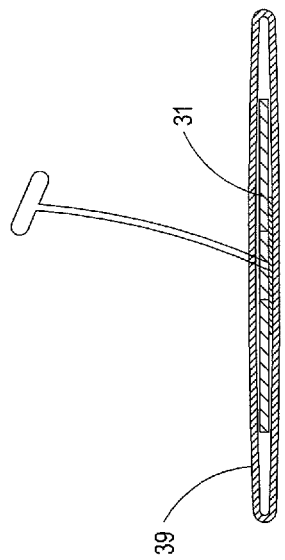
FIG. 7B is an end view of the exemplary link and sleeve of FIG. 7A along line 7-7.
Figure 7A:
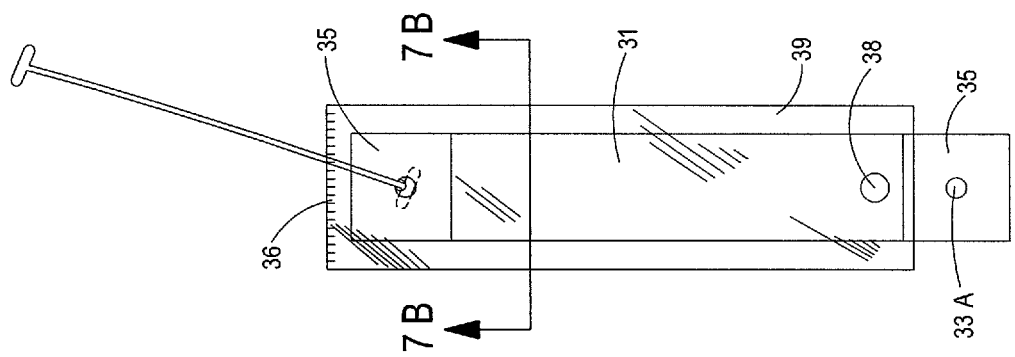
FIG. 7A is a top view of an exemplary breakaway link enclosed within an exemplary waterproof sleeve having an opening therein to receive flood water.

In some embodiments, a waterproof wrapper 39 having one or more openings therein may be provided around some or all of a breakaway link 30. An exemplary embodiment is illustrated in FIGS. 7A and 7B. The wrapper may be made of plastic, cellophane, foil, or other flexible waterproof material, and is designed to prevent premature tearing or breakage of link 30 resulting from contact with irrigation spray, dew or other non-flood water. This may occur, for example, when the plants to be flooded have been recently irrigated or are wet with dew, to prevent that moisture from prematurely weakening and/or rupturing link 30. Wrapper 39 shields the paper portion 31 of link 30 from such waters. However, wrapper 39 need only cover the paper portion 31 of link 30, and in some embodiments, may be open at one or both ends (i.e., not covering the laminate end portion(s) 35 of link 30). Wrapper 39 is preferably sealed at its upper end 36 to prevent dew or sprinkler water contacting the elongate member or indicator from being transmitted directly onto link 30, and is preferably open at its lower end to allow flood water to enter wrapper 39 and reach link 30 to weaken and eventually rupture the paper portion 31. In some embodiments, wrapper 39 may be provided with one or more side openings or perforations 38 to prevent flood water from collapsing the wrapper 39 too tightly against link 30 which could prevent the flood water from efficiently entering the wrapper and reaching the link 30 inside. Openings 38 should not be large enough to allow much spray water or dew to enter, but should still allow flood water to enter so as to reach, weaken and rupture the paper portion 31 of link 30. Openings 38, together with one or more corresponding openings on link 30, help assure consistent release time for link 30 when wrapper 39 is used. The timing of such rupture may be slightly later than that of embodiments without a wrapper 39, and the user should position the apparatus accordingly. In the embodiment shown in FIG. 7A, if spike 27 is inserted into opening 33A, wrapper 39 will not prevent the paper portion 31 of link 30 from tearing when it gets wet. See FIGS. 1 and 2.

Figure 10:
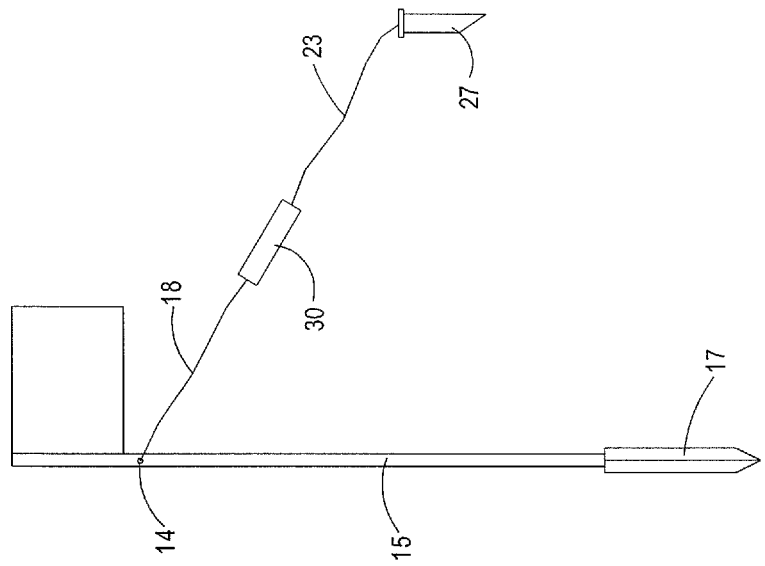
FIGS. 9-12 are side views showing exemplary apparatuses having different attachment methods in accordance with some embodiments of the present invention.
Figure 9:
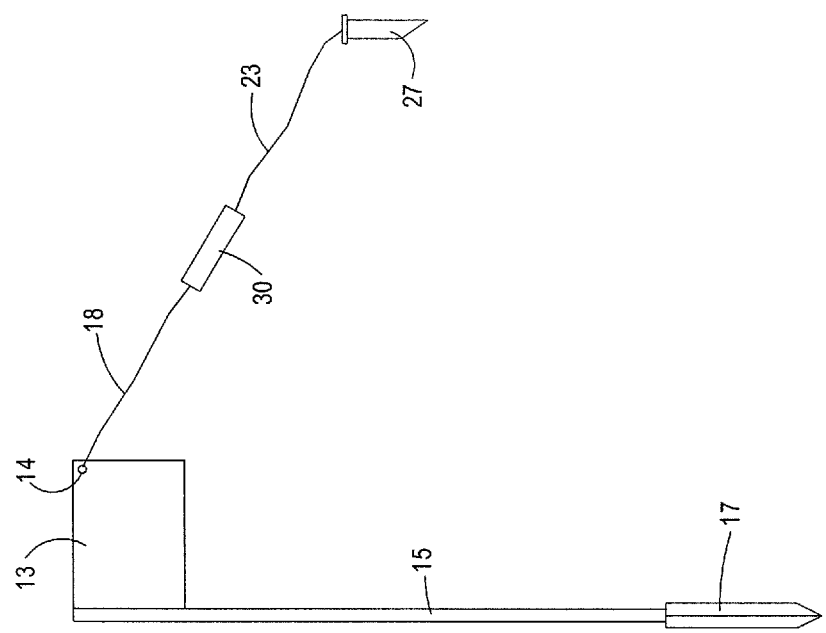

Referring now to FIGS. 9 and 10, in some embodiments, ropes or wires can be used to connect the breakaway link to the indicator, elongate member, and/or stake(s). In some examples, as shown in FIG. 9, and without limitation, a hole 14 can be provided on the indicator 13. In other examples, and as shown in FIG. 10, hole 14 can be provided on the elongate member 15. A first end of breakaway link 30 can be attached to either the indicator 13 or elongate member 15 through hole 14 via a wire 18. In some examples, and without limitation, wire 18 can be a fishing wire or nylon wire. In other examples, wire 18 can be a twine rope. In other examples, wire 18 can be a fabric or nylon strap. Similarly, a second end of breakaway link 30 can be attached to stake 27 via a second wire, rope, or strap 23. Various ways of connecting the wires to the indicator, elongate member, and lower (second) stake are contemplated in accordance with embodiments of the present invention. For example, and without limitation, the ends of the wires may be tied in knots, or may have ends with geometries larger than the holes. In other examples, the ends of the wires may be connected through a clamping or clipping mechanism.

In some embodiments, the ends of the breakaway link may be directly engaged to the indicator, elongate member, and/or lower stake. For example, and without limitation, the breakaway link can be engaged to the flag indicator through a snap button device. A first portion of the button can be integrated into the breakaway device and a complementary portion of the button can be integrated into the flag indicator. It is to be appreciated that other direct engagement means are contemplated in accordance with some embodiments of the present invention.

Figure 12:
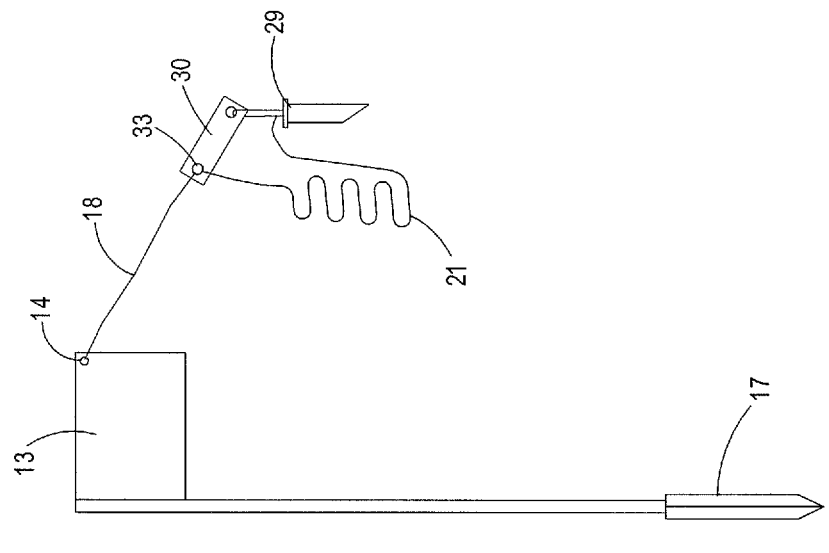
Figure 11:
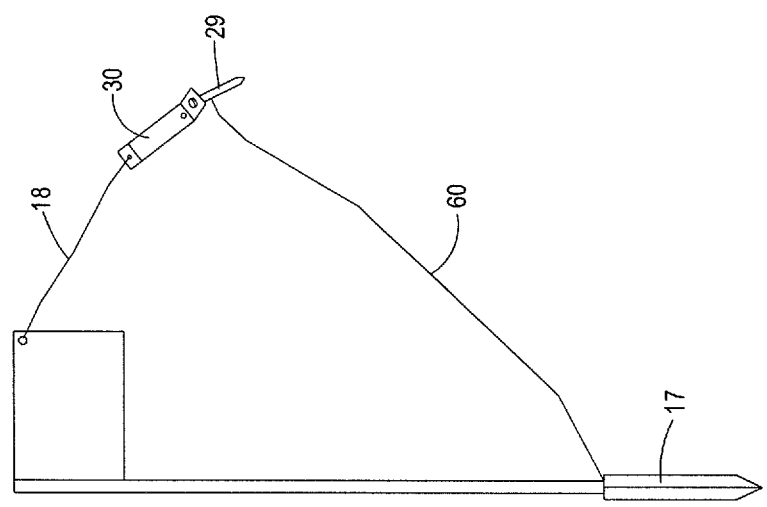

In preferred embodiments, the breakaway link is directly engaged with the lower stake. Referring now to FIGS. 11 and 12, stake 29 can be a nail or other similar device. The lower (second) stake 29 can be disposed through a connection perforation in breakaway link 30 (for example, and without limitation, connection perforation 33A as illustrated in FIG. 7). It is to be appreciated that in these embodiments, when stake 29 is driven into the trench, breakaway link 30 may be firmly held against a wall of the trench, preferably the bottom of the trench. However, it is to be appreciated that other types of stakes 29 and means for attaching the stake to the breakaway device are contemplated in accordance with some embodiments of the present invention. For example, and without limitation, stake 29 can have a head for engaging with the breakaway link through a snap fit connection.

In an alternative exemplary embodiment illustrated in FIGS. 8A and 13A, it is seen that link 30 may be provided with reinforced ends 35 having openings 33A at each end. A central section of this embodiment of link 30 may also be reinforced, if desired. Link 30 of FIG. 8A may be inserted through a slot 19 in indicator 13, and folded such that the (reinforced) central section is adjacent to slot 19 to avoid tearing. Stake 27 is inserted through or otherwise engaged to openings 33 in both ends of the folded link 30, and driven into the ground as illustrated in FIG. 13A.

Figure 8B:
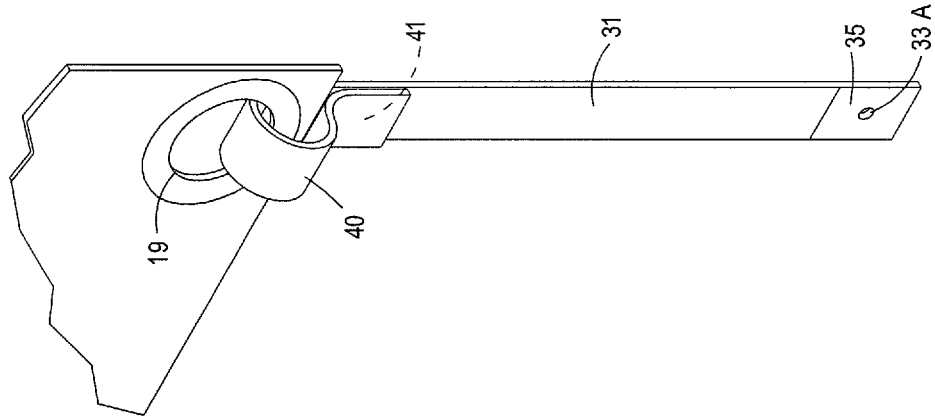
FIG. 8B is a perspective installed view of an exemplary breakaway link having a reinforced end with circular perforation, and a reinforced opposite end having an adhesion area in accordance with some embodiments of the present invention.

In another alternative embodiment illustrated in FIG. 8B, it is seen that one end of link 30 may be provided with reinforcement 35 and an opening 33A therein through which stake 27 is attached or driven to hold the link against the ground. The opposite end 40 of this exemplary link 30 may be provided with an adhesion area 41 (such as two-sided tape) that may be exposed when ready for use. Indicator 13 is provided with a slot or opening 19 for receiving the opposite end 40 of link 30. End 40 is inserted through opening 19, and then folded and adhered against itself using the adhesive area 41. It is to be appreciated that adhesive 41 may be provided with link 30, or it may be applied in the field. It is also to be appreciated that any other suitable method of attaching end 40 against itself may employed including, without limitation, use of one or more hooks, staples, snaps, interengaging hook and loop surfaces (Velcro®), chemically treated surfaces that bond together, and the like.

It is to be appreciated that it may be desirable to link the first and second stakes to provide for efficient retrieval. Once the trench is flooded, the lower (second) stake may be completely submerged in water, thus making it difficult for the irrigator to collect. Leaving this stake in the trench may not be desired because doing so may interfere with other farming operations. For example, the stake may puncture tractor tires or be ingested by harvesting devices. In some embodiments, the lower stake can have an extended portion with a height greater than the depth of the trench so that the second stake can be easily seen. In some embodiments, the lower stake can also include a handle to assist in the removal process.

In other embodiments, the second stake can be tethered to the first stake, the elongate rod, and/or the indicator. Referring now to FIG. 11, a third line 60 can have a first end engaged with first stake 17 and a second end engaged with second stake 29. After breakaway link 30 tears, an irrigator can retrieve the first portion of the apparatus (including the indicator, elongate rod, and first stake 17) and follow line 60 to retrieve the second portion of the apparatus (including second lower stake 29). Alternatively, depending on the construction of second stake 29, the irrigator can simply pull line 60 thereby dislodging the second stake 29 from the trench. In other embodiments, and referring to FIG. 12, the flag indicator 13 can be connected to both the breakaway link 30 and the second stake 29. Line 18 can have a first end attached through hole 14 on flag indicator 13 and pass through a hole 33 in breakaway link 30. In some embodiments the line 18 can be tied in a knot through hole 33. In other embodiments, a grommet can be provided to secure line 18 in a fixed position relative to hole 33. It is to be appreciated that line 18 must be secured to the breakaway link 30 at hole 33 to provide restraining force between indicator 13 and breakaway link 30.

As illustrated in FIG. 12, a second line 21 can be connected to stake 29. It is to be appreciated that there should be sufficient slack in line 21 between hole 33 in breakaway link 30 and stake 29. Once the breakaway link 30 tears, the elongate rod may extend in an upright position and take all the slack out of line 21. In some embodiments, lines 18 and 21 may comprise a single line 18-21 that is tied or otherwise secured to hole 33 in line 30. In these embodiments, upon retrieval, the irrigator can simply cut a slit in breakaway link 30 at hole position 33 to separate the line 18-21 from the torn portion of breakaway link 30. It is to be appreciated that other ways of connecting the indicator and/or elongate member to the lower stake, through breakaway link 30, are contemplated in accordance with some embodiments of the present invention.

Figure 13:
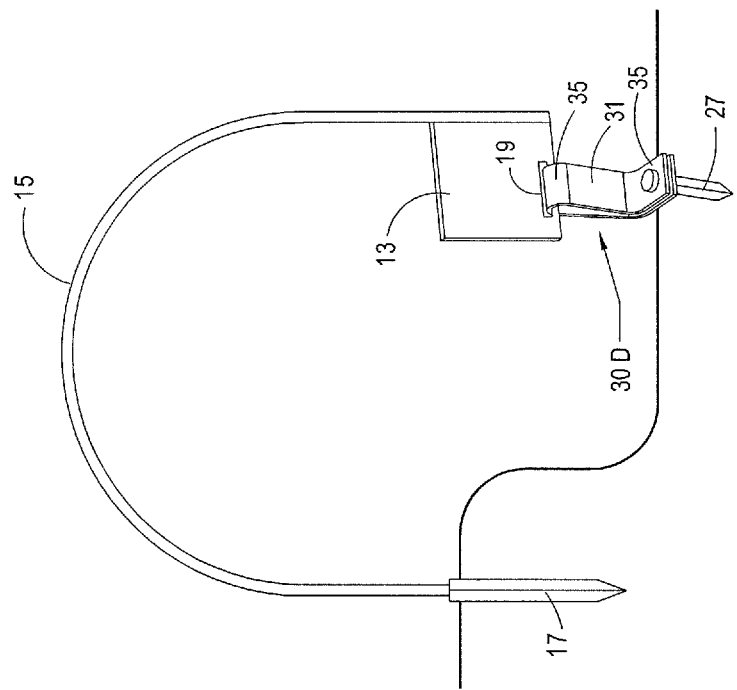
FIG. 13 is a side view showing an exemplary apparatus having an elongate member comprising two hingedly connected rigid rods in accordance with some embodiments of the present invention.
Figure 13:
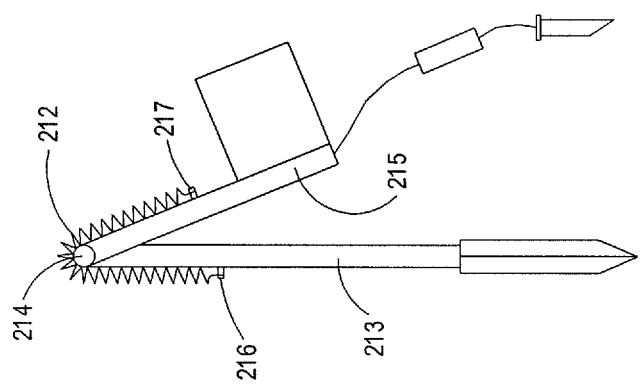

Referring to FIG. 13, in some embodiments, the elongate member can include a first rigid portion 213 and a second rigid member 215 operatively coupled through hinge 214. A spring 212 can be provided and attached to a portion 216 of the first rigid portion 213 and also attached to a portion 217 of the second rigid portion 215. Once the breakaway link tears, the spring acts to extend the second rigid portion 215 upright. It is to be appreciated that the elongate member can include any number of rigid portions, hinges, and springs in accordance with some embodiments of the present invention.

Figure 15:
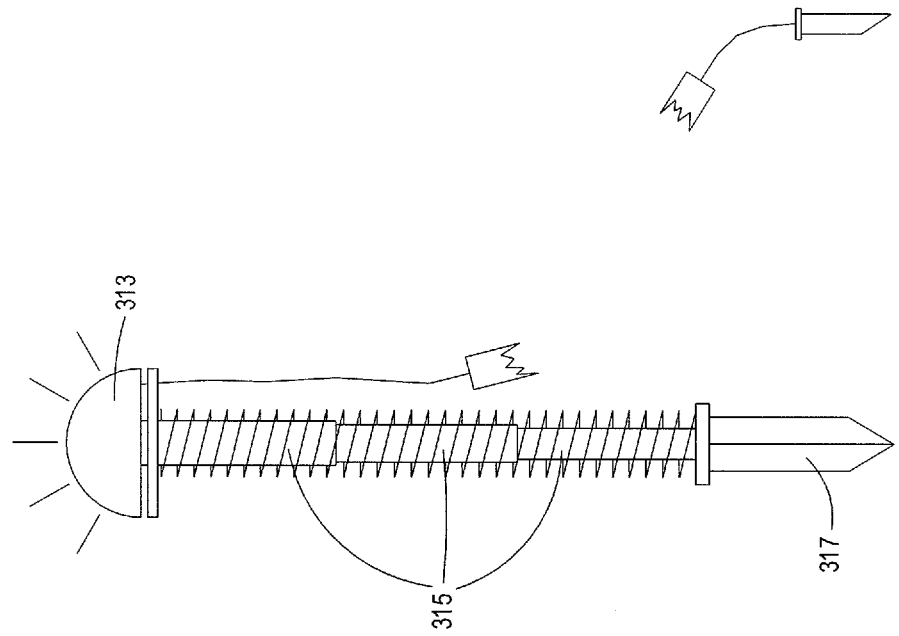
FIG. 15 is a side view corresponding to that of FIG. 14, where the breakaway link has detected water and torn.
Figure 14:
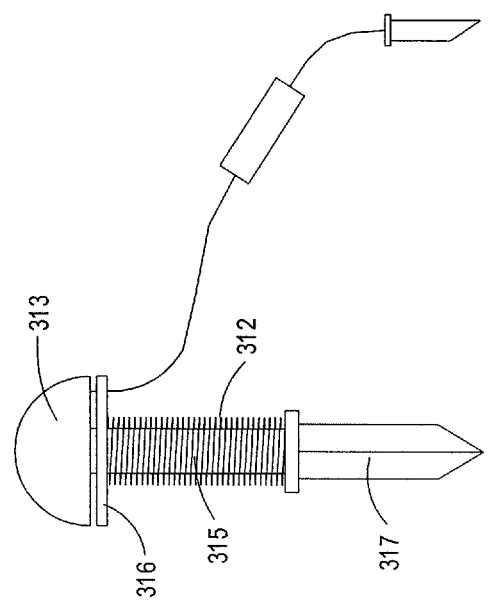
FIG. 14 is a side view showing an exemplary telescoping elongate member in accordance with some embodiments of the present invention, where the breakaway link has not detected water in the trench.

Referring to FIGS. 14 and 15, in some embodiments, the elongate member can include a telescopic rod 315. A spring 315 can be disposed between a pointed end or first stake 317 and a restraint 316. Wire 318 can be connected to the breakaway link and to indicator 313 through a hole (and optionally latching mechanism of restraint 316). Upon tearing of the breakaway link, the spring operates to extend the telescopic rod 315 upwards. In some embodiments, the light indicator 313 can have a switch connected to the end of the wire 318 for activating the light. In some embodiments, wire 318 may include a stop for engaging with restraint 316 and providing tension to activate the switch. However, it is to be appreciated that other means for extending the telescoping rod and activating the indicator are contemplated in accordance with some embodiments of the present invention. It is further to be appreciated that the invention is not limited to the illustrated examples, but rather, various modifications are contemplated. For example, the light indicator of FIGS. 14 and 15 can be replaced with a flag indicator, an audio indicator, or a remote signal generator. In other examples, the indicator may include both a flag, a light, and an audio generator.

In an example of use, an irrigator first drives the elongated member having an indicator at a first end thereof into the ground, or drives a first stake into the ground in a field and connects the elongate member with the first stake. The irrigator then attaches a first end of a breakaway link with a portion of either the elongate member or the indicator. Next, the irrigator drives a lower (second) stake in the field at a location proximal to the elongated member, and attaches an opposite end of the link to the lower stake, thereby pulling the indicator down near the ground and providing tension through the link. The lower stake should be positioned in the field such that the breakaway link is below a water line of the field. In the example, the irrigator then introduces a flow of water to flood the field. When water reaches the link, it is weakened and eventually gives way, allowing the indicator to rise up or otherwise be noticed. Upon receiving an indication that the breakaway link has broken, the irrigator may then reduce and/or shut off the flow of water.

It is to be understood that variations and modifications of the present invention may be made without departing from the scope thereof. It is also to be understood that different combinations of the various features of the several embodiments disclosed herein may be provided in permutations and/or combinations different from and in addition to those described in the particular exemplary embodiments or illustrations herein, all within the scope of the present invention. It is also to be understood that the present invention is not to be limited by the specific embodiments disclosed herein, but only in accordance with the appended claims when read in light of the foregoing specification.

What is claimed is:
1. A signaling apparatus comprising:
   a. a flexible elongated member having an indicator at an end thereof;
   b. a stake; and
   c. a breakaway link comprising
      i. a first end for engagement with one of a group consisting of said elongated member and said indicator; and
      ii. a second end for engagement with said stake, wherein said breakaway link is adapted to separate at a location between said first end and said second end when exposed to water, such that when water reaches said stake, said breakaway link separates causing said flexible elongated member to move said indicator in an upward direction.

2. The apparatus of claim 1, wherein said breakaway link includes a paper portion.

3. The apparatus of claim 2, wherein a waterproof cover is provided over at least the paper portion of said breakaway link.

4. The apparatus of claim 3 wherein said waterproof cover has at least one opening therein.

5. The apparatus of claim 1, wherein said breakaway link includes a dissolvable gelatin portion.

6. The apparatus of claim 1, wherein said indicator comprises a reflective member.

7. The apparatus of claim 1, wherein said indicator comprises a flag.

8. The apparatus of claim 7, wherein a reflective member is provided on said flag.

9. The apparatus of claim 1, wherein said indicator comprises a light.

10. The apparatus of claim 1, wherein said indicator comprises an audio generator.

11. The apparatus of claim 1, wherein said elongate member comprises a flexible pole.

12. The apparatus of claim 1, wherein reflective material is provided on one of a group of said indicator, said elongate member, and combinations thereof.

13. The apparatus of claim 1, wherein said elongate member comprises a first rigid member hingedly engaged with a second rigid member, and a spring is provided to urge said first and second members to an end-to-end orientation.

14. The apparatus of claim 1, wherein said elongate member comprises a telescopic rod, and said apparatus further comprises a latch engaged with said first end of said breakaway link and a spring engaged with said telescopic rod.

15. The apparatus of claim 1, wherein said breakaway link comprises a rectangular strip of paper.

16. The apparatus of claim 15, wherein each of said first and said second ends of said breakaway link comprise reinforcement material.

17. The apparatus of claim 16, wherein said reinforcement material comprises a plasticized tape or laminate.

18. The apparatus of claim 15, wherein said strip of paper further comprises at least one perforation disposed between said first and said second ends.

19. The apparatus of claim 1, wherein the first end of said breakaway link is engaged to one of said elongate member and said indicator through a first line.

20. The apparatus of claim 19, wherein said first line is further engaged with said stake.

21. The apparatus of claim 1, wherein said second end of said breakaway link is engaged through a second line to said stake.

22. The apparatus of claim 1, wherein said stake is directly engaged to said link through a portion of said second end of said breakaway link.

23. An apparatus comprising:
   a. an elongate member having an indicator at a first end thereof;
   b. a first stake engaged with a second end of said elongate member;
   c. a second stake; and
   d. a breakaway link comprising
      i. a first end for engagement with one of a group consisting of said elongate member and said indicator; and
      ii. a second end for engagement with said second stake, wherein said breakaway link is adapted to separate at a location between said first end and said second end when exposed to water,
   such that when water reaches said second stake, said breakaway link separates causing said flexible elongated member to move said indicator in an upward direction.

24. The apparatus of claim 23, wherein said first stake is engaged with said second stake through a third line.

25. The apparatus of claim 23 wherein said link includes a paper portion, and a waterproof cover is provided over at least said paper portion.

26. A signaling apparatus comprising
   a. a flexible elongated member having an indicator at an end thereof;
   b. a stake; and
   c. a breakaway link comprising a first end for engagement to itself through an opening in said indicator, and a second end for engagement with said stake,
   wherein said breakaway link is adapted to separate at a location between said first end and said second end when exposed to water such that when water reaches said stake, said breakaway link separates causing said flexible elongated member to move said indicator in an upward direction.

27. A signaling apparatus comprising
   a. a flexible elongated member having an indicator at an end thereof;
   b. a stake; and c. a breakaway link comprising a first end having a first opening therein and a second end having a second opening therein, said link extending through an opening in said indicator such that said first and second end openings are engaged with said stake, wherein said breakaway link is adapted to separate at a location between said first end and said second end when exposed to water such that when water reaches said stake, said breakaway link separates causing said flexible elongated member to move said indicator in an upward direction.

28. A method for determining when water has reached a position in a field, comprising steps of:
   a. engaging one end of a flexible elongate member with ground in said field, the opposite end of said elongate member having an indicator thereon;
   b. driving a stake in the field at a location proximal to said elongate member such that water flowing through said field will reach said stake;
   c. engaging a breakaway link between said stake and one of a group consisting of (i) said elongate member and (ii) said indicator, said breakaway link being adapted to separate when exposed to water; and
   d. causing water to flow into said field where said stake is located such that when said water reaches said stake, said breakaway link separates causing said flexible elongate member to move upwardly.

29. The method of claim 28 wherein the step of engaging said breakaway link further comprises the step of attaching a line between said link and said elongate member or indicator.

30. The method of claim 28 wherein the step of engaging said breakaway link further comprises the steps of engaging a first end of said link to itself through an opening in said indicator, and engaging a second end of said link with said stake.

31. The method of claim 28 wherein said link comprises a first end having a first opening therein and a second end having a second opening therein, and said step of engaging said breakaway link further comprises the steps of extending said link through an opening in said indicator and engaging said first and second end openings with said stake.

32. The method of claim 28, wherein said stake is positioned in a trench such that said breakaway link touches the ground at the bottom of said trench.

33. The method of claim 28, further comprising the steps of introducing water into the field to flood said field, and upon receiving an indication that said breakaway link has broken, shutting off said flow of water 34. The method of claim 28, further comprising the steps of introducing water into the field to flood said field, and upon receiving an indication that said breakaway link has broken, reducing the flow of water.

35. A method for determining when water has reached a position in a field, comprising steps of:
   a. driving a first stake into the field;
   b. engaging one end of an elongate member with said first stake, the opposite end of said elongate member having an indicator thereon;
   c. driving a second stake in the field at a location proximal to said first stake such that water flowing through said field will reach said second stake;
   d. engaging a breakaway link between said second stake and one of a group consisting of (i) said elongate member and (ii) said indicator, said breakaway link being adapted to separate when exposed to water; and
   e. causing water to flow into said field where said second stake is located such that when said water reaches said second stake, said breakaway link separates causing said flexible elongate member to move upwardly.

\* \* \* \* \*